R. W. AMOS.
ELECTRICAL PURIFICATION APPARATUS.
APPLICATION FILED OCT. 3, 1908.
1,069,993.
Patented Aug. 12, 1913.
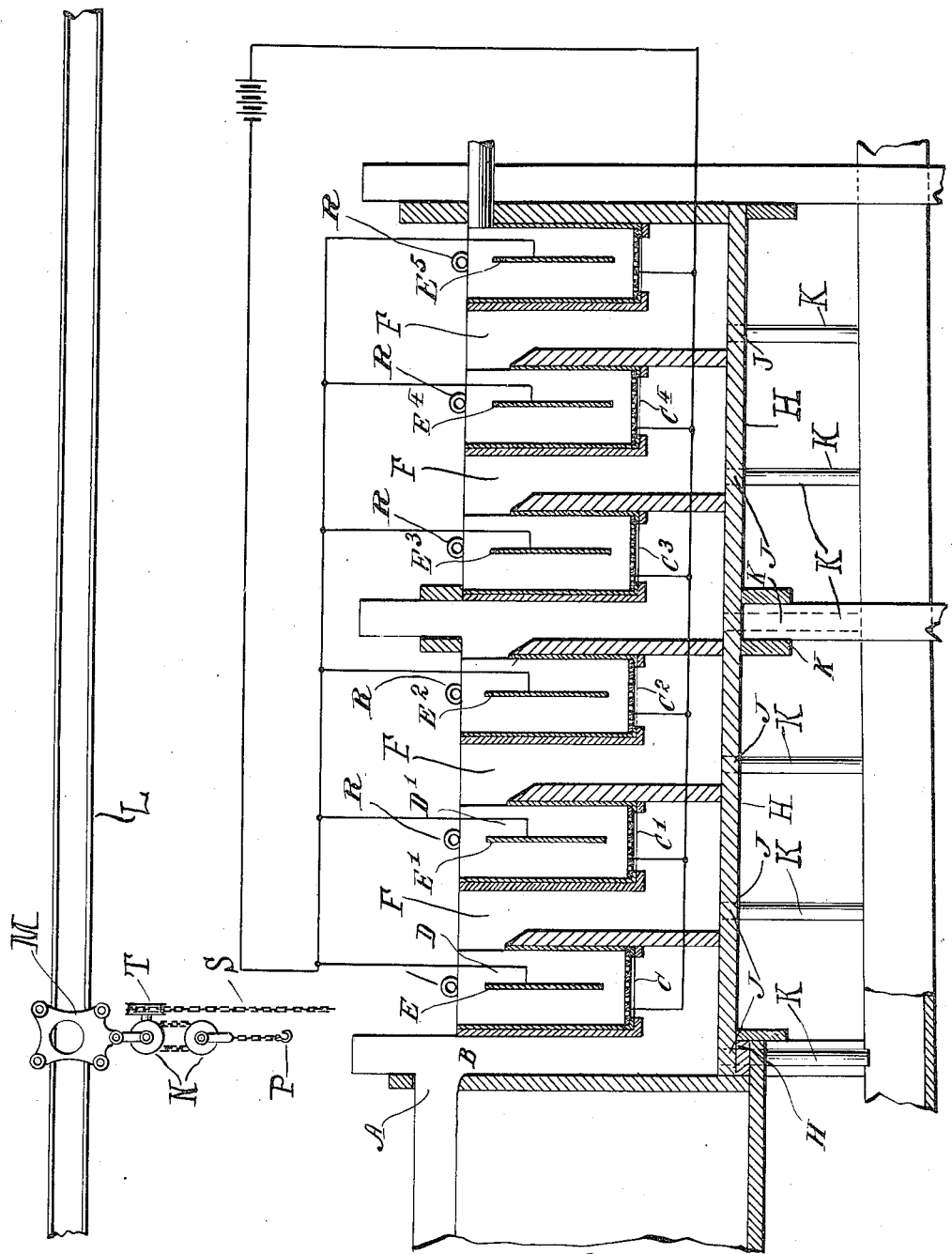

UNITED STATES PATENT OFFICE.

RICHARD W. AMOS, OF PATERSON, NEW JERSEY, ASSIGNOR TO NATIONAL PURIFICATION COMPANY, OF NEW YORK, N. Y., A CORPORATION.

ELECTRICAL PURIFICATION APPARATUS.

1,069,993. Specification of Letters Patent. Patented Aug. 12, 1913.

Application filed October 3, 1908. Serial No. 456,038.

*To all whom it may concern:*

Be it known that I, RICHARD W. AMOS, a citizen of the United States, and a resident of Paterson, in the county of Passaic and State of New Jersey, have invented certain new and useful Improvements in Electrical Purification Apparatus, of which the following is a specification.

My invention relates to improvements in an apparatus for electrical purification of sewage and other substances.

By the use of my invention I not only kill germs but also precipitate or throw down certain hard or material portions of the substance treated.

Referring to the accompanying drawing the figure illustrates an apparatus embodying the preferred form of my invention.

Referring now to the drawing A designates an inlet orifice for sewage or other material to be treated. This inlet may be located at any suitable point but I prefer to have it open into a passage B which would carry the material downward to come in contact with the bottom C of the electric filters D, D', etc. These bottoms C as shown are perforated and are formed of metal, or at least some electric conducting substance.

E, E', etc., designate a series of metallic or other electric conducting plates which may be moved up and down or toward or away from the electric conducting bottom or plates C, to change the strength of the current as hereinafter described. The compartments F in which these electric cells are arranged are provided with walls or insulating material. In other words in this electric filtering apparatus I may use concrete, wood or insulated metal—it being essential merely that the only electric conducting medium be the vertically arranged plates E, E', etc., and the bottom plates C, C', etc.

H designates a base for the entire system provided with the discharge apertures J at suitable points in each compartment. These discharge orifices will preferably be connected with pipes K leading to any suitable point of discharge.

The operation of my apparatus is as follows: The sewage or other material to be treated comes in through the ingress orifice A passes down through the space B and is brought into contact with the plate C. There it receives an electric shock or an electric discharge of electric current which first kills the germs and second precipitates certain substances which thereupon fall to the bottom of each compartment and are at will carried away to the discharge orifice J and the discharge pipes K.

It will be observed that by the use of my invention nothing except the purified water can pass through the holes in the bottom plates C. In other words by the use of my invention I pass the purified liquid upward instead of downward everything which is electrically precipitated goes down and away from the energized plates.

The vertically arranged plates E, E', etc., are connected in series as are also the bottom plates C, C', etc. In other words I have a plurality of electric cells connected in series. Were I to connect these cells up in the ordinary manner I would obviously get a short circuit. Consequently I connect them up in what may be called reverse directions. In other words whereas the positive line 1 strikes the vertical plate E first and the vertical plate $E^5$ last the negative line 2 strikes the bottom plate $C^5$ first and the bottom plate C last.

In order to avoid the possibility of a short circuit, it will be advisable to control the strength of the current to avoid the possibility of the same jumping from one box to another, or in other words, from one of the vertical plates to another or from one of the bottom plates to another. It is my intention to maintain the current running in the direction indicated, or, in other words, commencing with the positive terminal of the battery or other source of electrical energy, connections will be made across the positive electrodes or conductors from E to $E^5$ and the negative terminal of the battery or other source of electrical energy will be connected up in an opposite direction across the negative electrodes, that is to say, the positive electrode most remote from the battery will be opposed to and coöperate with the negative electrode nearest to the battery. Any method of wiring which will accomplish this result will be satisfactory.

Preferably the compartments F will be removable and I have shown each one provided with a ring R, R, etc., to assist in the removal thereof.

L designates an overhead track on which, as shown, runs a carriage M which carries a pulley arrangement of any suitable character such as N, carrying at its lower end a hook P adapted to engage with the various rings R, R, etc. These may be controlled by a chain S running over a pulley T as shown.

What I claim as new is:

1. In an electrical purification apparatus, the combination with a series of separate compartments suitable for the treatment of sewage, of an electrical cell within each of such compartments, an electrode comprising a horizontally disposed perforated plate forming the bottom of each cell and a vertically disposed electrode centrally located within each cell, means for connecting said electrodes with a suitable source of electrical energy, and means for conducting the material to be treated in an upward direction through each of such horizontally-disposed perforated electrodes and into contact with the vertically-disposed electrodes.

2. In an electrical sewage purification apparatus, the combination with a series of compartments suitable for the treatment of sewage, of a horizontally-disposed electrode in each of such compartments comprising a perforated metallic plate, a vertically-disposed electrode contiguous to each of such horizontally-disposed perforated plates, a source of electrical energy, connections from said source across the horizontally-disposed electrodes in one direction and across the vertically disposed electrodes in an opposite direction, and means for conducting the material to be treated successively through the horizontally disposed electrodes and into contact with the vertically-disposed electrodes.

3. In an electrical purification apparatus, the combination with a precipitation tank provided at its top with an inlet and outlet and having means at its bottom for removing precipitated material, an electrical cell removably supported within said tank and separating said inlet and outlet, a perforated metallic electrode forming the bottom of said cell, a vertically-disposed electrode centrally supported within the cell, a source of electrical energy and means for conducting electricity from said source through the said electrodes.

4. In an electrical purification apparatus the combination with a series of separate compartments suitable for the treatment of sewage, of an electrical cell removably arranged within each of said compartments, each of said cells provided with a horizontally disposed perforated electrode and a vertically disposed centrally located electrode, means for conducting the material to be treated successively into each compartment through the horizontally disposed perforated electrode and into contact with the vertically disposed electrode.

In witness whereof, I have signed my name to the foregoing specification in the presence of two subscribing witnesses.

RICHARD W. AMOS.

Witnesses:
   Jos. F. O'Brien,
   P. F. Sonnek.

Copies of this patent may be obtained for five cents each, by addressing the "Commissioner of Patents, Washington, D. C."